United States Patent [19]

Riesgraf

[11] 4,389,499

[45] Jun. 21, 1983

[54] ERASABLE INKS CONTAINING THERMOPLASTIC BLOCK COPOLYMERS

[75] Inventor: Diane A. Riesgraf, Rockville, Md.

[73] Assignee: The Gillette Company, Boston, Mass.

[21] Appl. No.: 318,306

[22] Filed: Nov. 5, 1981

[51] Int. Cl.$^3$ .......................... C08K 5/01; C09D 11/18; C08L 53/00

[52] U.S. Cl. .................................. 523/161; 524/505; 525/89; 525/901

[58] Field of Search ............... 523/161; 524/297, 505; 525/89, 901

[56] References Cited

U.S. PATENT DOCUMENTS

| | | | |
|---|---|---|---|
| T959,010 | 6/1977 | Hansen | 525/97 |
| 3,875,105 | 4/1975 | Daugherty et al. | 523/161 |
| 3,972,848 | 8/1976 | Lakshmanan | 525/901 |
| 4,039,629 | 8/1977 | Himes et al. | 525/89 |
| 4,059,554 | 11/1977 | Pacansky | 524/386 |
| 4,097,290 | 6/1978 | Muller et al. | 106/30 |
| 4,104,326 | 8/1978 | Fodor | 525/901 |
| 4,216,131 | 8/1980 | Himes et al. | 525/89 |
| 4,216,132 | 8/1980 | Zweig et al. | 525/89 |
| 4,244,862 | 1/1981 | Handa et al. | 524/505 |

*Primary Examiner*—Melvyn I. Marquis
*Assistant Examiner*—Herbert J. Lilling
*Attorney, Agent, or Firm*—Leonard J. Janowski

[57] ABSTRACT

An erasable ink containing a thermoplastic block copolymer, pigment particles, and a solvent. In a preferred embodiment, an erasable ink requiring little or no pressurization is provided by employing a mixture of radial and linear block copolymers and a mixed solvent system falling within a specific range of solubility parameter. Polybutene and poly-alpha-methylstyrene are preferred additives to decrease smearing tendency.

7 Claims, No Drawings

ERASABLE INKS CONTAINING THERMOPLASTIC BLOCK COPOLYMERS

BACKGROUND OF THE INVENTION

1. Field of the Invention

The present invention relates to an erasable ink, and more particularly, to an erasable ink containing a thermoplastic block copolymer.

2. Description of the Prior Art

In choosing a writing instrument, line intensity and erasability must be taken into account. Until recently, the choice was between these two factors since it was impossible to have both high line intensity and high erasability in the same writing instrument. Writing instruments such as pencils possess high erasability (i.e., the written line can be removed readily) but are relatively low in line intensity (i.e., the contrast between the written line and the paper is low). Because of this, a xerographic copy of a document written in pencil is typically a poor reproduction. In contrast, writing instruments such as ball point pens, fountain pens, and soft- or porous-type pens produce written lines which are relatively intense but lack any significant degree of erasability without damage to the underlying writing surface, or require additional material to mask the unwanted lines.

Accordingly, the prior art contains numerous attempts at writing instruments containing inks which produce a written line of high intensity, and yet are erasable for at least the first few hours after being placed upon the writing surface. This combination produces a written document having all the desirable attributes of both systems, and within a short period of time being written, possess the permanency typically desired in written documents.

Once such system is described in U.S. Pat. No. 3,875,105 to Daugherty et al., issued on Apr. 1, 1975. That patent describes an erasable writing medium suitable for use in ball point pens having a discontinuous phase of a solid colorant and a homogeneous continuous phase including a matrix material having cohesive properties exceeding its property to adhere to the substratum being written upon. The ink consists of a pigment, stabilized with adsorbed surfactant, dispersed in a multicomponent solvent system containing a polyvinyl methyl ether elastomer. On transfer to paper, the low boiling toluene evaporates into the air or penetrates into the paper causing a viscosity increase and enhancement of the elastic characteristics of the pigment dispersion. Adhesion between the elastomer and pigment remains greater than that between the elastomer and paper until certain components of the solvent system migrate into the paper, at which time polymer adhesion increases and erasability decreases. The erasability of the ink is stated to depend in part on the rapid evaporation of at least one of the components of the continuous phase. Accordingly, the volatile component is stated to be one preferably with an evaporation rate of 3 to 15 on a relative numerical scale on which ethyl ether is assigned an evaporation rate of 1, such as toluene which is stated to have a rate of 6.1. The volatile component is employed in a range from 24.0 to 29.0%. The line intensity of that ink is dependent upon the relative quantity of pigment used. As stated in that patent, it may be necessary to dispense the ink in a pressurized ball pen depending upon the relative quantity of pigment used since at higher levels of pigment the ink may not flow with sufficient rapidity through the feed passageways of the conventional, gravity-fed ballpoint pen. Moreover, in an ink of such a high level of volatile component, some means must be provided to prevent the volatile component from evaporating into the atmosphere which would increase the viscosity of the ink while in the pen.

U.S. Pat. No. 4,097,290 to Muller et al., incorporated herein by reference, describes a ballpoint writing instrument capable of writing with an intense line which is easily erasable by mechanical means for an initial period of several hours but eventually becomes non-erasable. These properties are attained by an ink composition containing certain specific rubbers and volatile solvents which control erasability. The rubbers employed are natural or of a chemical structure essentially duplicating that of natural rubber. In addition, the ink contains a volatile low boiling organic solvent having a boiling point less than 180° C. and exhibiting 100% evaporation within 60 minutes, and a high boiling organic liquid solvent having a boiling point of greater than 300° C. The volatile low boiling organic solvent is included to rapidly increase the viscosity of the ink in the written line thereby minimizing penetration by the ink into the paper. Although the ink yields a very intense line with good erasability for the first few hours after it is written, it suffers from the same disadvantage as that set forth previously for the Dougherty et al. Patent. Namely, it possesses a relatively high concentration of a low boiling, rapidly vaporizable solvent, and a relatively high concentration of pigment such that means for subjecting the ink to super-atmospheric pressure is necessary to facilitate the flow and supply of ink to the ball. In addition, the rubber must be milled prior to its incorporation into the ink to produce an average molecular weight of between 100,000 and 900,000 and preferably between 400,000 and 750,000. The milling process is somewhat difficult to control in that milling too rapidly, or for too long a time, will produce rubber particles unsuitable for use in the ink.

There are often also problems in addition to time and expense when ink must be supplied under pressure. If the ball doesn't fit almost perfectly in the ball seat, point bleed can occur, and will become worse as the ball seat wears with writing. Writing smoothness is also affected by pressurization because the ball must be pushed into its seat, and the ink pressure must be counteracted in order to get ink flow. Another major disadvantage of prior art erasable ink is that the written line is easily smeared.

Accordingly, a need exists for an erasable ink for use in ballpoint pens which will produce a line of high erasability and high line intensity, which does not depend upon a high level of volatile solvent, does not smear, is readily prepared without the necessity of controlled milling of the rubber component, and requires little or no pressurization.

SUMMARY OF THE INVENTION

The present invention comprises an erasable ink composition containing a thermoplastic block copolymer, a pigment, and a solvent for the copolymer.

DETAILED DESCRIPTION OF THE INVENTION

It has now been found that an erasable ink producing a written line of high line intensity and high erasability can be produced without employing a high volatility solvent or high levels of pressurization, by the use of thermoplastic block copolymers in place of the matrix material of Daugherty et al. or the rubbers of Muller et al.

The block copolymers of the present invention are best described as thermoplastic elastomers which have an ABA, $(AB)_nX$, or $(-AB-)_n$ arrangement of A (thermoplastic) and B (rubbery) blocks. The hard A blocks may be glassy (e.g., polystyrene) or crystalline (e.g., polyester, polyurethane); the soft B blocks must be elastomeric (e.g., polybutadiene, polyisoprene). When the hard segments are incompatible with the soft segments, the domains or regions of hard blocks act as reinforcing physical cross-links for the rubbery matrix. In contrast to chemically cross-linked rubbers, the physical network is thermally reversible. When the polymer is heated above the $T_g$ (or $T_m$) of the hard block, the hard blocks soften and allow the rubber to flow and to be processed as a thermoplastic.

The manufacture of block copolymer thermoplastic elastomers depends upon the type and arrangement of the blocks. For example, styrene-butadiene ABA and $(AB)_nX$ block copolymers are conveniently prepared by alkylithium initiated anionic polymerization. Thermoplastic $(-A-B-)_n$ polyurethanes are synthesized by step-growth addition copolymerization of dihydroxy compounds such as polytetramethylene ether glycol and toluene diisocyanate. The copolyester-ether $(-A-B-)_n$ copolymers are produced by the polycondensation of dicarboxylic acids (e.g., terephthalic acid) with glycols or polyether glycols. The preferred block copolymers of the present invention are those made from styrene-diene comonomers having a block arrangement of ABA or $(AB)_nX$ such as those sold under the trade names Kraton (Shell Chemical) and Solprene (Phillips Chemical Company).

A preferred block copolymer for use in the present invention is a styrene-isoprene-styrene block copolymer. Each molecule consists of an individual chain of three blocks—an elastomeric block in the center (isoprene) and a thermoplastic block on each end (styrene). The polystyrene end blocks form a discrete phase which locks the continuous phase isoprene midblocks into a elastomeric network. Because mechanical cross-links rather than chemical cross-links are present, the copolymers can be dissolved in many common hydrocarbon solvents without premastication. By dissolving the polystyrene domains, the network is unlocked permitting mixing with other materials. Since such rubbers are low in molecular weight (typically less than 100,000 to about 150,000), the solutions produced have low viscosity even with high solids content.

Another type of preferred elastomer is a "radial" $(AB)_nX$ block copolymer consisting of styrene and isoprene blocks. In a linear arrangement such as that described above, each molecule contains two styrene blocks at the ends of an isoprene midblock. In contrast, the preferred radial structure contains four isoprene midblocks which are all joined at a common center, with a styrene block at the outer end of each isoprene block. Compared to linear block copolymers, generally the radial block copolymers at similar molecular weight and monomer ratio produce lower solution viscosities. For example, the viscosity of a 20% and 25% by weight solution in toluene of a linear polymer having a molecular weight of about 150,000 is 600 centipoises and 1600 centiposes respectively. In contrast, solutions of a radial polymer having a molecular weight of between 175,000 and 275,000 at the same concentration in toluene have viscosities of 570 centipoises and 1650 centipoises respectively. The typical range of molecular weights of radial polymers is about 150,000 to about 300,000.

While the use of either linear or radial block copolymers alone results in an acceptable ink, it is preferred to blend the two together in a range of radial to linear of about 7:1 to 1:1. The preferred blending is in a ratio of about 3 to 1 radial to linear.

Block copolymers having butadiene or isoprene midblocks are preferred, although block copolymers having ethylene-butylene midblocks can also be used in pressurized systems. The range of concentration for the block copolymer is between about 10% and about 30% by weight. Higher concentrations can be used but contribute little to erasability and result in rapidly increasing viscosity with a concomitant increase in pressurization requirements. The ratio of diene to styrene is typically between about 60:40 and about 90:10.

The molecular weight of the rubbers employed in the present invention is low, typically less than 300,000, as compared to general purpose rubbers such as styrene-butadiene rubber, polysioprene rubber, and natural rubber even after natural rubber is broken down by milling. Natural rubbers used in the prior art typically have molecular weights between about 400,000 and about 750,000. With block copolymers, breakdown is neither desired nor required. Instead, the polystyrene domains are softened by solvating which permits the polymer to flow under shear. Dissolution and solvent release are quite rapid with such block copolymers. They dissolve or disperse readily in common hydrocarbon solvents to yield high solids, low viscosity solutions. Depending upon which solvent is used, the interaction between hard (glassy) and soft (rubbery) segments of a thermoplastic block will be affected. This in turn strongly influences the viscoelastic behavior of the rubber.

Three general factors must be considered in preparing inks according to the present invention: solubility parameter, volatility, and critical pigment concentration (CPC). These factors require greater consideration when preparing a pen needing low levels (less than 1.0 psi) or no pressurization. Each of these factors will be discussed generally before focusing on how each affects pressurization requirements.

In determining which solvents to employ in the ink of the present invention, the solubility parameter (represented by $\delta$), which is a measure of the total forces holding the molecules of a solid or a liquid together, is a useful guide. It has the units of $(cal/cm^3)^{\frac{1}{2}}$. Every compound is characterized by a specific value of solubility parameter. Materials having about the same solubility parameter tend to form homogeneous mixtures or to be miscible. Those with different solubility parameters tend to form separate layers or to be mutually insoluble. Discussions of solubility parameter concepts are presented in (1) Encyclopedia of Polymer Science and Technology, Interscience, New York (1965), Vol. 3, Pg. 833; (2) Encyclopedia of Chemical Technology, Interscience, New York (1971), Sup. Vol., Pg. 889; (3) Polymer Handbook, J. Brandrup and E. H. Immergut, Interscience, New York (1966), pgs. IV-337 to IV-341; and (4) I. T. Smith, Review of Current Literature on the Paint and Allied Industries, Vol. XXXVI, No. 247, (January 1963), Pgs. 1-4; all incorporated herein by reference.

The block copolymers in the present invention will dissolve in most organic solvents having solubility parameters between about 7 and about 10.5. In the case of inks that will be subject to pressurization, low boiling, high volatility solvents such as toluene, naphtha, and the other low boiling solvents in the Muller et al. Patent can be advantageously employed. In such an embodiment, the solubility parameter of the organic solvent combination need only fall within the outer limits of the solubility parameter of about 7 to about 10.5.

It will often be desirable to use a combination of solvents in the ink of the present invention since the resulting mixed solvent system acts as a solvent for the polymer, as a dispersant for the pigment, and as a plasticizer for the polymer or polymers. The formula to use in determining the solubility parameter for such a mixed solvent system is $$\delta = \sum_{i=1}^{n} \text{mole fraction}_i * \delta_i$$

The value for a particular solvent is readily obtained by consulting one of the reference texts incorporated by reference above.

To give sufficient intensity to the written line produced by the ink of the present invention, finely divided pigmenting materials are added. By finely divided, reference is made to particle sizes within the range of about 0.01 microns to about 5 microns, the lower figure being a limitation as to visibility and the upper figure being limited by ballpoint clearance; that is, the gap between the ball and the retaining lip of the socket.

The pigment is typically added to the other components of the ink in the form of a dispersion containing 50-60% of dioctyl phthalate. A typical blue ink would contain 12.6% Victoria Blue having a particle size of about 0.025 microns and about 5.7% Phthalocyanine Blue having a particle size of about 0.015 microns. Unless an unpressurized ink is desired as discussed below, the dispersion would then be diluted with an equal volume of toluene or other similar solvent.

For every pigment/solvent system, as well as for every pigment/solvent/polymer system, there is a "critical pigment concentration" (CPC), below which no pressure is required to initiate flow. Above the CPC, constant pressure is required for pigment/solvent systems and the pressurization of pigment/solvent/polymer systems increases in proportion to increases in pigment concentration, signifying a pigment-polymer interaction. Each particular pigment, polymer and solvent combination has its own CPC. Thus it is difficult to predict what the CPC for any particular system will be.

For inks requiring no pressurization, low volatility solvents are employed. Low volatility solvents are defined as those having a value of not greater than 10 on a scale of 0 to 100 where butyl acetate is used as a standard and has a value of 100 as measured according to the National Printing Ink Research Institute Raw Materials Handbook, Volume 1, Organic Solvents, incorporated hereby by reference. Page 9 of that volume provides data for various solvents.

To produce a pen requiring a low level (less than 1.0 psi) or no pressurization, each of the above factors must be controlled within a relatively narrow range, and care must be excersied in choosing the block copolymer or copolymers. Each of these factors will now be discussed in connection with refills requiring little or no pressurization.

Block copolymers having butadiene or isoprene midblocks, and mixtures of radial and linear block copolymers are preferred when preparing refills requiring little or no pressurization. For gravity flow with no pressurization, such block copolymers must be used in conjunction with an organic solvent or a mixture of organic solvents having a solubility parameter between about 8.1 and about 8.7. Where no pressurization is involved, such solvent or solvents must also possess low volatility as defined above. Preferred low volatility solvents for use in inks of the present invention are set forth in Table 1 below. One or more solvents from Group 1 are mixed with one or more solvents from Group 2 to produce a combination having a solubility parameter in the appropriate range.

Finally, the CPC must be considered. It has generally been found that the CPC of most pigment/solvents/polymer systems is 9-10% or less. Choosing the exact pigment concentration is readily accomplished by one skilled in the art after selecting a mixed solvent system and a particular block copolymer.

TABLE 1

| Solvent & Manufacturer | Chemical Description | Solubility Parameter | Boiling Point, °C. | Evaporation Rate[a] |
|---|---|---|---|---|
| GROUP 1 | | | | |
| Isopar M (Exxon) | Heavy isoparaffinic naphtha —$C_{11}$-$C_{17}$ | 7.2 | 207 | <10 |
| MagieSol 47 Oil (Magie) | Hydrotreated middle distillate | 7.2 | 238 | <1 |
| 1102 Oil (Witco) | Light vacuum gas oil | 7.2 | 266 | <1 |
| MagieSol 44 Oil (Magie) | Hydrotreated middle distillate | 7.5 | 226 | 2 |
| 1108 Oil (Witco) | Hydrotreated middle distillate | 7.3 | 280 | <1 |
| Norpar 13 (Exxon) | Normal paraffin —$C_{11}$-$C_{17}$ | 7.4 | 229 | <10 |
| Dodecane | $C_{12}$ hydrocarbon | 7.8 | 216 | med.low |
| GROUP 2 | | | | |
| Aromatic 150 (Exxon) | Heavy aromatic naphtha | 8.7 | 183 | <10 |
| DXE (Gulf) | 1,1-di(ortho-xylyl)ethane | 8.8 | 335 | v.low |
| Han (Exxon) | Aromatic middle distillate extract | 8.9 | 169 | <10 |

TABLE 1-continued

| Solvent & Manufacturer | Chemical Description | Solubility Parameter | Boiling Point, °C. | Evaporation Rate[a] |
|---|---|---|---|---|
| DOP | dioctylphthalate | 8.9 | 384 | ~0 |

[a]Relative evaporation rates where butyl acetate = 100

Pressurization is required for the erasable inks of the present invention which are too viscous to flow at a sufficient rate under the force of gravity alone. Prior art erasable inks often require 10 psi to produce an acceptable written line. In contrast, the inks of the present invention typically require less than 1.0 psi to produce a written line of similar quality. The amount of pressure required depends on several factors including temperature, the particle size of the pigment, the polymer employed, and the gap between the ball and the lip of the ball-retaining socket. The pressure for any particular combination is readily determined by one skilled in the art. Various means for applying appropriate pressure are well known in the prior art including U.S. Pat. No. 3,000,354; U.S. Pat. No. 3,099,252; and U.S. Pat. No. 3,425,779, all incorporated herein by reference.

A preferred additive to the ink of the present invention is polybutene to enhance the cohesive strength of particularly styrene-isoprene-styrene elastomers. The polybutene has no effect on pressurization or line intensity, but increases the erasability of inks when used in concentrations up to about 10% by weight. Polybutenes are a series of butylene polymers composed predominently of high molecular weight mono-olefins (85–98%), the balance being isoparaffins. Preferred polybutenes have a viscosity of about 3026–3381 centistokes at 210° F. and average molecular weight of about 2060. Polybutenes are made by polymerizing an isobutylene-rich butene stream with a metal halide catalyst. The polymer backbone structure resembles polyisobutylene, although more 1- and 2-butenes are incorporated in the lower molecular-weight fractions. The olefin structure is predominently the trisubstituted type ($R-CH=CR_2$). Only minor amounts of vinylidene

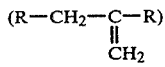

and terminal vinyl ($R-CH=CH_2$) structures are present. A preferred polybutene is sold under the trade name Indopol H-1500 by Amoco Chemicals Corporation, 200 E. Randolph Dr., Chicago, Ill. 60601.

Another preferred additive is poly-alpha-methylstyrene which can be used alone or in conjunction with polybutenes. With this additive, line intensity is unchanged, but erasability is increased with increasing concentration. However, the pressure to write increases proportionately with concentration such that poly-alpha-methylstyrene is useful only in pressurized inks and is typically used in concentrations up to about 10% by weight.

It has been found that the addition of polybutene and poly-alpha-methylstyrene dramatically reduces the tendency to smearing of prior art erasable inks which is seen initially after writing.

Erasability can be evaluated by manual erasure and visual observation, but this involves personal factors such as pressure applied, size of surface being erased, etc. A more accurate evaluation can be conducted by applying the trace by a standard writing test method in which the paper is advanced beneath the writing instrument at a rate of 11.5 mm. per 10 cycles and at the same rate under an erasing head provided with an Eberhard-Faber Pink Pearl Pencil Eraser #101 (Shore A34 Durometer hardness, ASTM D 2240), applied to the paper bearing the trace under a load of 375 grams upon a surface measuring 9 mm. by 23.8 mm. in the direction of travel, the erasing head reciprocating at a rate of 80 cycles per minute, the length of each stroke being 63.5 mm. Each trace is thus subjected to 7 cycles of erasing and results can be visually observed or rated by photometer readings.

Smearing can be tested by taking Ross micro wax #1365, obtained from Frank B. Ross Company, Inc., 6–10 Ash St., Jersey City, N.J. and forming it into plugs the size of a standard eraser, placing it into an erasing machine as described above and running over a fresh tracing five cycles. This produces a reasonably uniform smear which can then be placed into a reflectometer and measured against the reflectance of the same paper without ink on it.

The equation used to determine the percent smearing is $$\% \text{ smearing} = \frac{R_u - R_s}{R_u - R_m} \times 100,$$

where $R_u$ is the reflectance of the unmarked paper, $R_m$ is the reflectance of the marked paper, and $R_s$ is the reflectance of the smeared area.

While the major components of the ink have been stressed above, the presence in the ink of additives such as corrosion inhibitors, lubricants such as lauric acid or stearic acid, preservatives, parting compounds (between ink in a reservoir and a gaseous pressurizing agent), and dispersing agents, is not precluded.

The invention will be further illustrated by consideration of the following examples which are intended to be purely exemplary of the use of the invention.

EXAMPLE I

An ink employing a radial styrene-isoprene-styrene block copolymer sold under the trademark Solprene 418 by Phillips Chemical Company, Borger, Tex., having a styrene/isoprene ratio of 15/85 was used to prepare an erasable ink requiring no pressurization. 20 grams of the block copolymer was dissolved in 49.8 grams of dodecane and 10.2 grams of dixylylethane. To this was added 20 grams of a pigment dispersion of 31.6% Victoria Blue, 14.1% Phthalo Blue, and 54.2% dioctyl phthalate. The combination of solvents produced a solubility parameter of 8.1. The resulting ink produced a written trace with acceptable line intensity and erasability.

EXAMPLE II

Example I was repeated with 10 grams of a linear block copolymer having a styrene/isoprene ratio of 14/86 sold by Shell Chemical Company, Houston, Tex., and a mixed solvent system of 67.2 grams of isobutyl isobutyrate having a solubility parameter of 8.1, 2.8 grams of methyl ethyl ketone having a solubility parameter of 9.3, and 20 grams of the pigment dispersion of Example I. The resulting combination of solvents had a solubility parameter of 8.7. The resulting ink produced a written trace with acceptable line intensity and erasability.

EXAMPLE III

An ink employing a styrene-ethylene/butylene-styrene block copolymer sold under the trademark Kraton G1650 by Shell Chemical Company, Houston, Tex., having a styrene to rubber ratio of about 28 to 72 was prepared by mixing 10% by weight of block copolymer with 50% by weight of toluene. The dissolved polymer was then mixed with a pigment dispersion consisting of 60% by weight of toluene, 21.7% dioctyl phthalate, 12.6% Victoria Blue and 5.7% Phthalocyanine Blue. The resulting ink was placed in a conventional refill cartridge and pressurized to a pressure of 0.6 psi. The resulting ink produced a written trace with acceptable line intensity and moderate erasability.

EXAMPLE IV

Example III was repeated with a styrene-isoprene-styrene block copolymer sold under the trademark Kraton 1101 by Shell Chemical Company, Houston, Tex., having a styrene to rubber ratio of 30 to 70 in place of the styrene-ethylene/butylene-styrene block copolymer. The resulting ink produced a written trace with acceptable line intensity and good erasability.

EXAMPLE V

A refill capable of writing without pressurization was prepared employing an ink containing the following ingredients by weight: 40% Indofast Violet; 5.0% Kraton 1107, a linear styrene-isoprene-styrene block copolymer having a styrene/isoprene ratio of 14/86 sold by Shell Chemical Company, Houston, Tex.; 15.0% Solprene 423, a radial styrene-isoprene-styrene block copolymer having a styrene/isoprene ratio of 15/85; 5.0% Indopol H 1500, a polybutene sold by Amoco Chemical Co., Chicago, Ill.; 6% dioctyl phthalate; and a mixed solvent of 49% 1,1-di(orthoxylyl)ethane and 16% MagieSol 44 to produce a $\delta$ of approximately 8.4. The resulting ink produced a written line of good line intensity and good erasability.

EXAMPLE VI

A refill requiring a pressurization of about 0.3 psi and having good line intensity and good erasability was produced by the following formulation:

| Ingredients | %, w/w |
| --- | --- |
| Kraton 1107 | 5.0 |
| Solprene 423 | 15.0 |
| Indopol 1500 | 5.0 |
| Poly-alpha-methylstyrene | 6.0 |
| Aromatic 150 } q.s. to δ = | 8.4 |
| MagieSol 44 | |
| Victoria Blue | 15.0 |
| Dioctyl phthalate | 15.0 |

EXAMPLE VII AND VIII

Examples VII and VIII illustrate the beneficial effect of polybutene and poly-alpha-methylstyrene on smearing tendency.

| INK COMPOSITION (percent by weight) | | |
| --- | --- | --- |
| | Example VII | Example VIII |
| Solprene 423 | 16.2 | 14.7 |
| Kraton 1107 | 5.4 | 4.9 |
| Indopol H-1500 | — | 3.0 |
| Resin 18-210 (1) | — | 6.0 |
| Lauric Acid | 1.4 | 1.1 |
| Stearic Acid | 0.5 | 0.4 |
| Toluene | 26.5 | 19.5 |
| Dioctyl phthalate | 27.1 | 27.1 |
| BT-264D (2) | 15.8 | 15.8 |
| BT-427D (3) | 7.1 | 7.1 |

(1) Poly-alpha-methylstyrene sold by Amoco Chemicals Corp., Chicago, Illinois.
(2) Victoria Blue sold by E. I. DuPont, Wilmington, Delaware.
(3) Phthalocyanine Blue sold by E. I. DuPont, Wilmington, Delaware.

The inks of Examples VII and VIII were compared using the smearing test described above. The smearing tendency of the ink of Example VIII was about two-thirds that of Example VII and the inks of the prior art.

What is claimed is:

1. An erasable ink for use in a ball-point writing instrument comprising a pigmented organic solvent solution containing a mixture of thermoplastic block copolymers at least one of which has an arrangement of A (thermoplastic) and B (rubbery) blocks selected from the class consisting of ABA and (—AB)—$_n$; at least one other of which has an arrangement of A (thermoplastic) and B (rubbery) blocks consisting of (AB)$_n$X; in which said thermoplastic blocks are selected from the class consisting of styrene, ester and urethane blocks; in which said rubbery blocks are selected from the class consisting of butadiene, isoprene and ethylene-butylene blocks; in which the ratio of said rubbery blocks to said thermoplastic blocks is from 60:40 to 90:10; and in which the solubility parameter of said organic solvent is from about 7 to about 10.5.

2. An erasable ink as described in claim 1 in which the ratio of said block copolymers having an arrangement of A (thermoplastic) and B (rubbery) blocks selected from the class consisting of ABA and (—AB)—$_n$ to said block copolymer having an arrangement of A (thermoplastic) and B (rubbery) blocks consisting of (AB)$_n$X is from about 1:1 to about 1:7.

3. An erasable ink as described in claim 1 in which the ratio of said block copolymers having an arrangement of A (thermoplastic) and B (rubbery) blocks selected from the class consisting of ABA and (—AB)—n to said block copolymer having an arrangement of A (thermoplastic) and B (rubbery) blocks consisting of (AB)$_n$X is from about 1:1 to about 1:3.

4. An erasable ink as described in claim 1 in which at least one of said block copolymers has butadiene or isoprene midblocks.

5. An erasable ink as described in claim 1 in which at least one of said block copolymers has butadiene or isoprene midblocks and in which the solubility parameter of said organic solvent ranges from about 8.1 to about 8.7.

6. An erasable ink as described in claim 1 in which at least one of said block copolymers has butadiene or isoprene midblocks and in which said organic solvent is a mixture of at least two organic solvents, at least one of which has a solubility parameter of about 7.2 to about 7.8, at least one other of which has a solubility parameter of about 8.7 to about 8.9 and in which said mixture has a solubility parameter of about 8.1 to about 8.7.

7. An erasable ink as described in claim 1 in which at least one of said block copolymers has butadiene or isoprene midblocks, in which the solubility parameter of said organic solvent ranges from about 8.1 to about 8.7 and in which the concentration of pigment does not exceed about 10% by weight.

* * * * *